US012297074B2

(12) United States Patent
Kinnari et al.

(10) Patent No.: US 12,297,074 B2
(45) Date of Patent: May 13, 2025

(54) REMOTE MONITORING SYSTEM AND A METHOD FOR REMOTELY MONITORING AN ELEVATOR SYSTEM

(71) Applicant: Kone Corporation, Helsinki (FI)

(72) Inventors: Jouko Kinnari, Helsinki (FI); Matti Laakso, Helsinki (FI); Olli Mali, Helsinki (FI)

(73) Assignee: Kone Corporation, Helsinki (FI)

( * ) Notice: Subject to any disclaimer, the term of this patent is extended or adjusted under 35 U.S.C. 154(b) by 1536 days.

(21) Appl. No.: 16/729,902

(22) Filed: Dec. 30, 2019

(65) Prior Publication Data

US 2020/0223660 A1 Jul. 16, 2020

(30) Foreign Application Priority Data

Jan. 11, 2019 (EP) .................................... 19151365

(51) Int. Cl.
*B66B 1/34* (2006.01)
*B66B 1/28* (2006.01)
(Continued)

(52) U.S. Cl.
CPC .............. *B66B 1/3461* (2013.01); *B66B 1/28* (2013.01); *B66B 1/468* (2013.01); *B66B 3/002* (2013.01); *B66B 5/0018* (2013.01); *B66B 5/0025* (2013.01); *B66B 2201/103* (2013.01); *B66B 2201/4615* (2013.01); *B66B 2201/4623* (2013.01); *B66B 2201/463* (2013.01); *B66B 2201/4638* (2013.01); *B66B 2201/4653* (2013.01)

(58) Field of Classification Search
CPC ..... B66B 1/468; B66B 1/3461; B66B 5/0025; B66B 5/0018; B66B 5/02; B66B 5/0087; B66B 5/0006; B66B 5/0037; B66B 2201/4653; B66B 5/00; B66B 1/00; B66B 5/0043; B66B 1/40; B66B 2201/4607
See application file for complete search history.

(56) References Cited

U.S. PATENT DOCUMENTS

2017/0349398 A1 12/2017 Toutaoui

FOREIGN PATENT DOCUMENTS

DE 102018211776 A1 * 1/2020
EP 3539913 A1 * 9/2019 .............. B66B 1/28
(Continued)

OTHER PUBLICATIONS

Extended European Search Report for European Patent application No. 19151365.4 dated Jul. 12, 2019.
(Continued)

*Primary Examiner* — Jeffrey Donels
(74) *Attorney, Agent, or Firm* — Harness, Dickey & Pierce, P.L.C.

(57) ABSTRACT

A remote monitoring system for an elevator system includes at least one remotely operable intermediate device and a monitoring unit for remotely controlling operation of the at least one intermediate device at least partly. The monitoring unit controls at least one intermediate device to generate a remote command for controlling at least one operation of the elevator system, and monitors a response of the elevator system to the remote command. A method for remotely monitoring an elevator system is also included.

19 Claims, 7 Drawing Sheets

(51) Int. Cl.

| | |
|---|---|
| ***B66B 1/46*** | (2006.01) |
| ***B66B 3/00*** | (2006.01) |
| ***B66B 5/00*** | (2006.01) |

(56) References Cited

FOREIGN PATENT DOCUMENTS

| | | | | | |
|---|---|---|---|---|---|
| EP | 3680204 | A1 | * | 7/2020 | B66B 1/28 |
| EP | 3694800 | A2 | | 8/2020 | |
| JP | 2005-178968 | A | | 7/2005 | |
| JP | 2014208559 | A | * | 11/2014 | B66B 1/06 |
| JP | 6482734 | B1 | * | 3/2019 | B66B 1/3446 |
| KR | 10-2013-0087254 | A | | 8/2013 | |
| KR | 20190070028 | A | * | 6/2019 | |
| KR | 20190089203 | A | * | 7/2019 | |
| KR | 20200129144 | A | * | 11/2020 | |
| WO | WO-2007/011359 | A1 | | 1/2007 | |
| WO | WO-2010/133665 | A1 | | 11/2010 | |
| WO | WO-2013190711 | A1 | * | 12/2013 | B66B 5/0025 |
| WO | WO-2013190712 | A1 | * | 12/2013 | B66B 5/0025 |
| WO | WO-2014102991 | A1 | * | 7/2014 | B66B 1/06 |
| WO | WO-2015/004793 | A1 | | 1/2015 | |
| WO | WO-2015004790 | A1 | * | 1/2015 | B66B 5/0018 |

OTHER PUBLICATIONS

Notice of Opposition dated Aug. 17, 2023 issued against European Patent No. EP3680204.

Notice of Opposition dated Aug. 18, 2023 issued against European Patent No. EP3680204 (with English translation).

"Canary Wharf Lift Monitoring System." Canary Wharf Traction Lift Specification (Final Draft), Issue 3, revision 03 (2003).

"Das Ingenieurwissen [Engineering knowledge]". Hütte, 34th edition (2012).

"Wikipedia—potentialfreier Kontakt [Volt-free contact]." (2006) (with English translation).

"Lift HAWK Installation Guide." Memco (2018).

* cited by examiner

REMOTE MONITORING SYSTEM AND A METHOD FOR REMOTELY MONITORING AN ELEVATOR SYSTEM

RELATED APPLICATIONS

This application claims priority to European Patent Application No. 19151365.4 filed on Jan. 11, 2019, the entire contents of which are incorporated herein by reference.

TECHNICAL FIELD

The invention concerns in general the technical field of elevators. Especially the invention concerns monitoring of an elevator system.

BACKGROUND

Typically, if it is detected that an elevator system has gone out of service, e.g. a movement of an elevator car is stopped due to a malfunction, vandalism, etc., an immediate service need is generated, which means that a maintenance technician is sent to the site to fix the elevator system to which the elevator car belongs as soon as possible to minimize the impact on the customers. The detection whether the elevator system has gone out of service or not may be done based on data collected from the elevator. However, it may be difficult to make an accurate detection whether the elevator system has gone out of service or not, e.g. whether the elevator car is truly stopped or not. For example, in case the data is obtained from a unit retrofitted to the elevator system for monitoring the elevator system, the accuracy of the detection may be lower than when the data is obtained directly from an elevator controller.

Thus, typically a trade-off selection needs to be done between coverage and accuracy, when defining service need rules for a monitoring system of the elevator system. If the service need rules are too sensitive, i.e. false positive rate of the monitoring system is high, a lot of cost due to unnecessary service visits to the site is created, causing that the coverage is high, but the accuracy is poor. Alternatively, if the service need rules are too insensitive, i.e. false negative rate of the monitoring system is high, only a few of the out of the service of the elevator system situations, e.g. elevator car stoppage situations, are detected, causing that the coverage is poor, but the accuracy is high.

Thus, there is need to develop further solutions in order to improve at least partly reliability of monitoring of an elevator system.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a remote monitoring system and a method for remotely monitoring an elevator system. Another objective of the invention is that the remote monitoring system and the method for remotely monitoring an elevator system improve at least partly reliability of monitoring of an elevator system.

The objectives of the invention are reached by a remote monitoring system and a method as defined by the respective independent claims.

According to a first aspect, a remote monitoring system for an elevator system is provided, wherein the remote monitoring system comprising: at least one remotely operable intermediate device, and a monitoring unit for remotely controlling operation of the at least one intermediate device at least partly, wherein the monitoring unit is configured to: control at least one intermediate device to generate a remote command for controlling at least one operation of the elevator system, and monitor a response of the elevator system to the remote command.

The monitoring unit may further be configured to define whether the elevator system is responding to the remote command in expected manner.

Furthermore, the monitoring unit may further be configured to generate a signal indicating that the elevator system is out of service to an external computing entity in response to a detection that the elevator system is not responding to the remote command in expected manner.

Alternatively or in addition, the monitoring unit may be configured to provide the monitored response to an external computing entity, which may be configured to define whether the elevator system is responding to the remote command in expected manner.

The monitoring unit may be configured to control the intermediate device in response to receiving an instruction from an external computing entity.

The external computing entity may be one of the following: a cloud server, a service center, a data center.

The generated remote command may be a remote elevator command, wherein the remote elevator command may be a landing call, destination call, or a car call, and the operation of the elevator system may be movement of an elevator car.

Alternatively or in addition, the generated remote command may be a remote elevator command, wherein the remote elevator command may be one of the following: an emergency call, elevator alarm, opening or closing command of an elevator door, and the corresponding operation of the elevator system may be one of the following: making of an emergency call, generating an elevator alarm, opening or closing an elevator door.

Alternatively or in addition the generated remote command may be a remote maintenance command and the operation of the elevator system may be a maintenance operation.

The at least one intermediate device may be retrofittable to an existing elevator system.

The remote command generated by the intermediate device may correspond to a command generated in response to an activation of an elevator button.

The at least one intermediate device may be electrically connected to bridge a switch of an elevator button.

Furthermore, the intermediate device may comprise a switching device for providing the bridging of the switch of the elevator button.

The switching device may create an electric connection between the terminals of the switch of the elevator button causing that the switch of the elevator button is short-circuited to generate a command corresponding to a command generated in response to an activation of said elevator button.

Alternatively or in addition, the monitoring unit may be a retrofittable monitoring unit arranged to an existing elevator system and be independent of an elevator control system of the elevator system.

According to a second aspect, a method for remotely monitoring an elevator system is provided, wherein the method comprising: controlling at least one remotely operable intermediate device to generate a remote command for controlling at least one operation of the elevator system, and monitoring a response of the elevator system to the remote command.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

Figure 1A:
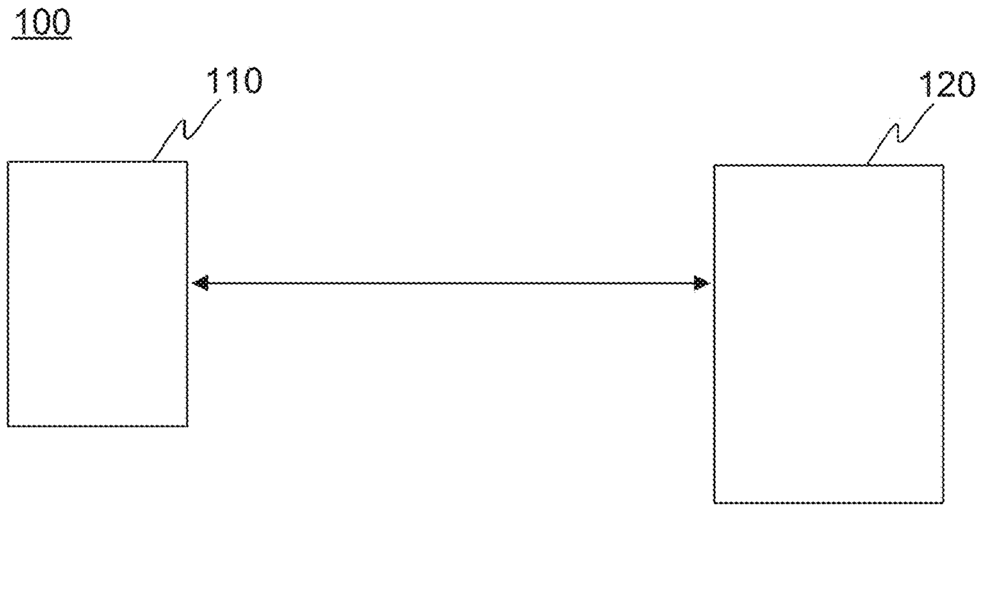
FIG. 1A illustrates schematically an example of a remote monitoring system according to the invention.
Figure 1B:
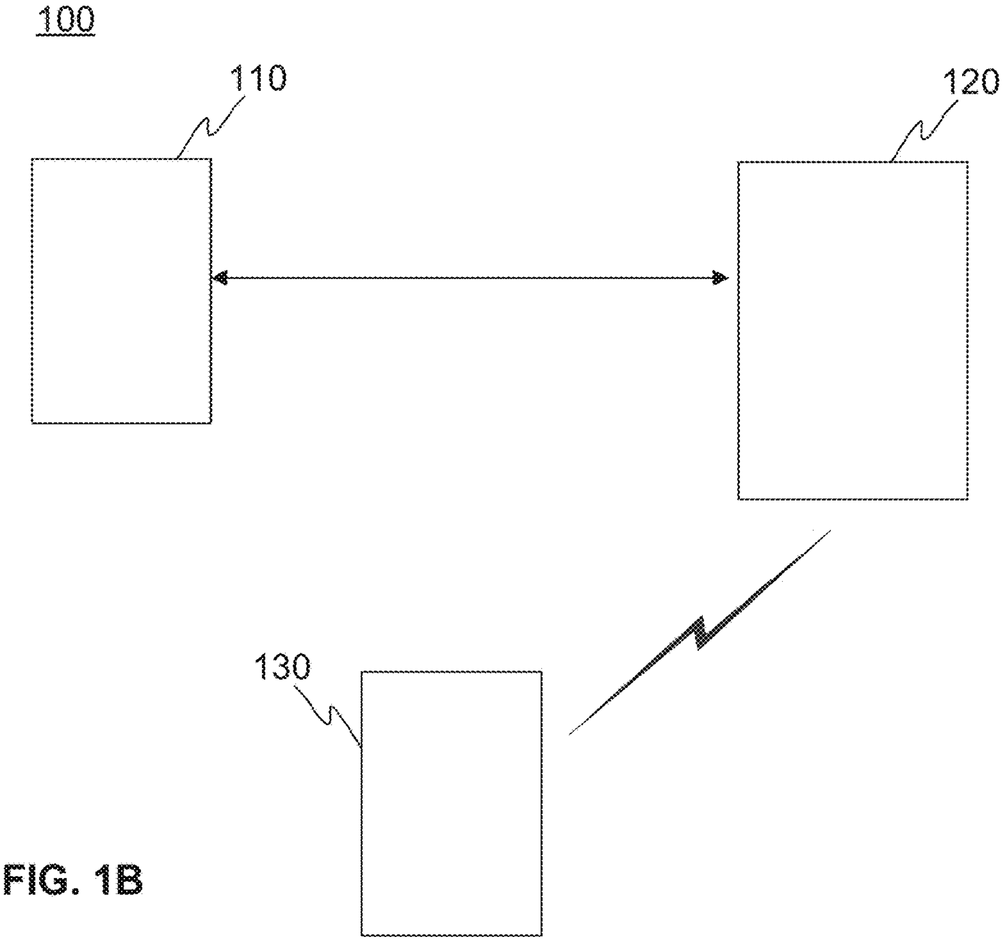
FIG. 1B illustrates schematically another example of a remote monitoring system according to the invention.

FIG. 1A illustrates schematically an example of a remote monitoring system 100 for an elevator system according to the invention. The remote monitoring system 100 according to the invention comprises at least one remotely operable intermediate device 110 for generating at least one remote command for controlling at least one operation of the elevator system 100 and a monitoring unit 120 for remotely controlling operation of the at least one intermediate device 110 at least partly. With the term "remotely operable" is meant that the intermediate device 110 may be remotely operated via the monitoring unit 120, i.e. one or more operations of the intermediate device 110 may be remotely controlled via the monitoring unit 120. The at least one remotely operable intermediate device 110 is communicatively coupled to the monitoring unit 120. The communication between the monitoring unit 120 and the at least one remotely operable intermediate device 110 may be based on one or more known communication technologies, either wired or wireless. FIG. 1B illustrates another example of a remote monitoring system 100 for an elevator system according to the invention, wherein the remote monitoring system 100 further comprises an external computing entity 130. The external computing entity 130 may be one of the following: a cloud server, a service center, a data center. The external entity herein means an entity that locates separate from the elevator system to be monitored. The use of the external computing entity as the computing entity 130 enables that sufficiently large computational resources may be available compared to a use of an internal computing entity. The implementation of the computing entity 130 may be done as a stand-alone entity or as a distributed computing environment between a plurality of stand-alone devices, such as a plurality of servers providing distributed computing resource. The monitoring unit 120 is communicatively coupled to the external computing entity 130. The communication between the monitoring unit 120 and the external computing entity 130 may be based on one or more known communication technologies, either wired or wireless.

Figure 2A:
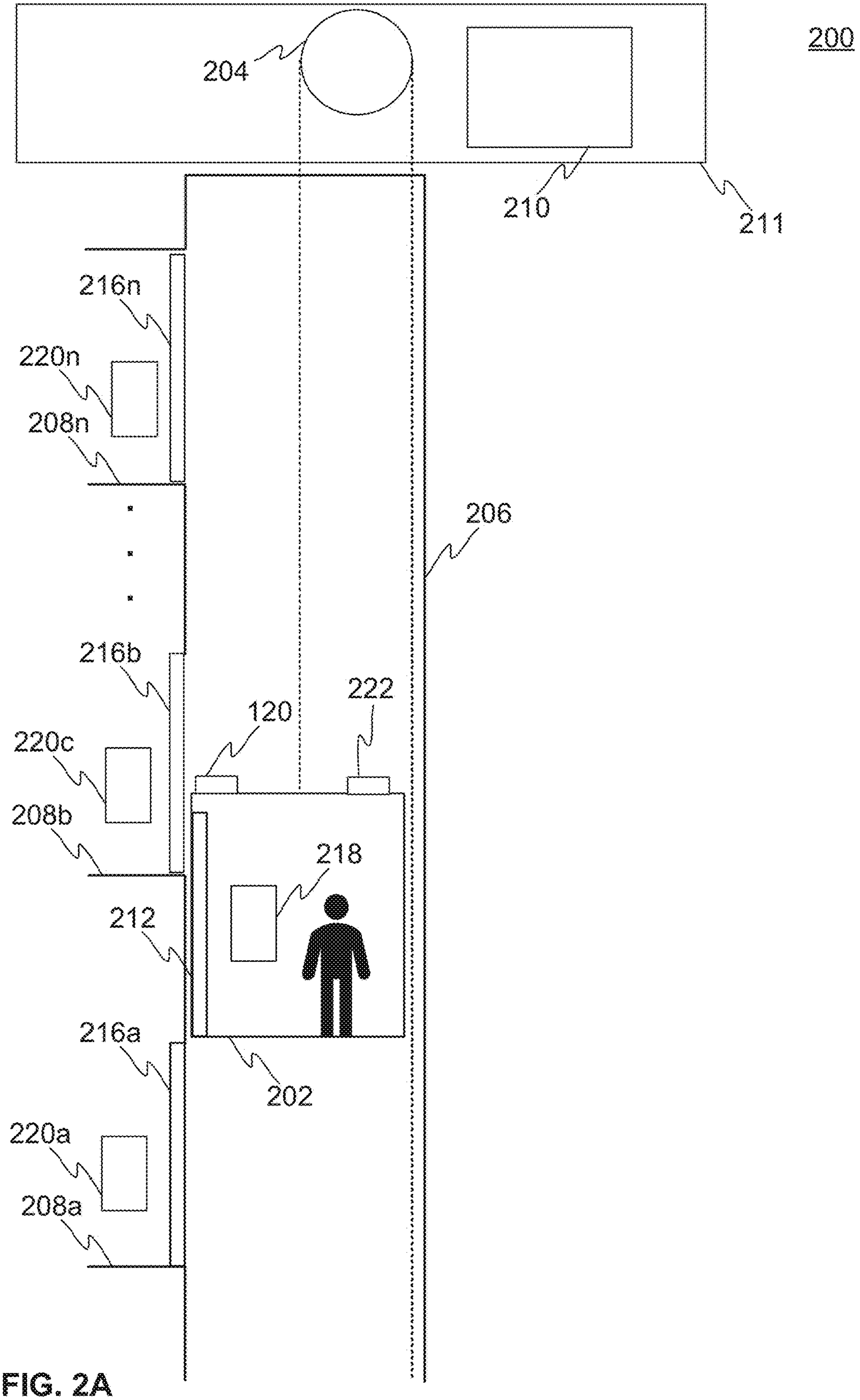
FIG. 2A illustrates schematically an example elevator environment wherein the embodiments of the invention may be implemented.

FIG. 2A illustrates an example elevator environment wherein the embodiments of the invention may be implemented as will be described. The example environment illustrated in FIG. 2A is an elevator system 200, which may comprise an elevator control system 210, an elevator car 202 and a hoisting machine 204 configured to drive the elevator car 202 along an elevator shaft 206 between landings 208*a*-208*n*. The elevator control system 210 may be configured to control the operation of the elevator system 200. The elevator control system 210 may reside in a machine room 211 or in the landing. The elevator car 202 may comprise an elevator car door 212 and a door control unit, e.g. a door operator. Furthermore, each landing 108*a*-108*n* may comprise a landing door 216*a*-216*n*. The elevator system 200 may further comprise a car operating panel 218 arranged inside the elevator car 202, a landing call panel 220*a*-220*n* arranged to each landing 208*a*-208*n*, an inspection drive station 222 arranged inside the elevator shaft 206, and any other maintenance interface control element (not shown in FIG. 2A). In the example of FIG. 2A the inspection drive station is arranged to the roof of the elevator car 202. The remote monitoring system 100 according to the invention may be implemented for example to the example elevator system 200 illustrated in FIG. 2A for remotely monitoring at least one operation of the elevator system 200. In the example of FIG. 2A the monitoring device 120 is arranged to the elevator car 202, however the physical locations of the monitoring unit 120 and/or the at least one intermediate device 110 in the elevator system are not limited. For sake of clarity the at least one intermediate device 110 is not shown in FIG. 2A.

In the above example the elevator system 200 comprises one elevator car 202 travelling along one elevator shaft 206, however the remote monitoring system 100 according to the invention may also be implemented in an elevator system comprising an elevator group, i.e. group of two or more elevator cars each travelling along separate elevator shaft configured to operate as a unit serving the same landings. In case of the remote monitoring system is implemented in an elevator system comprising an elevator group it may be used to remotely monitore at least one operation of the elevator group.

The intermediate device 110 may be retrofittable to an existing elevator system. Alternatively or in addition, the monitoring unit 120 may be a retrofittable monitoring unit arranged to an existing elevator system and may be independent of the elevator control unit 210 of the elevator system 200. This enables that the remote monitoring system 100 according to the invention may be implemented in a newly installed elevator system or in already existing elevator system. By implementing the remote monitoring system 100 according to the invention in already existing elevator system remote monitoring of at least one operation of already existing elevator system is enabled.

Figure 2B:
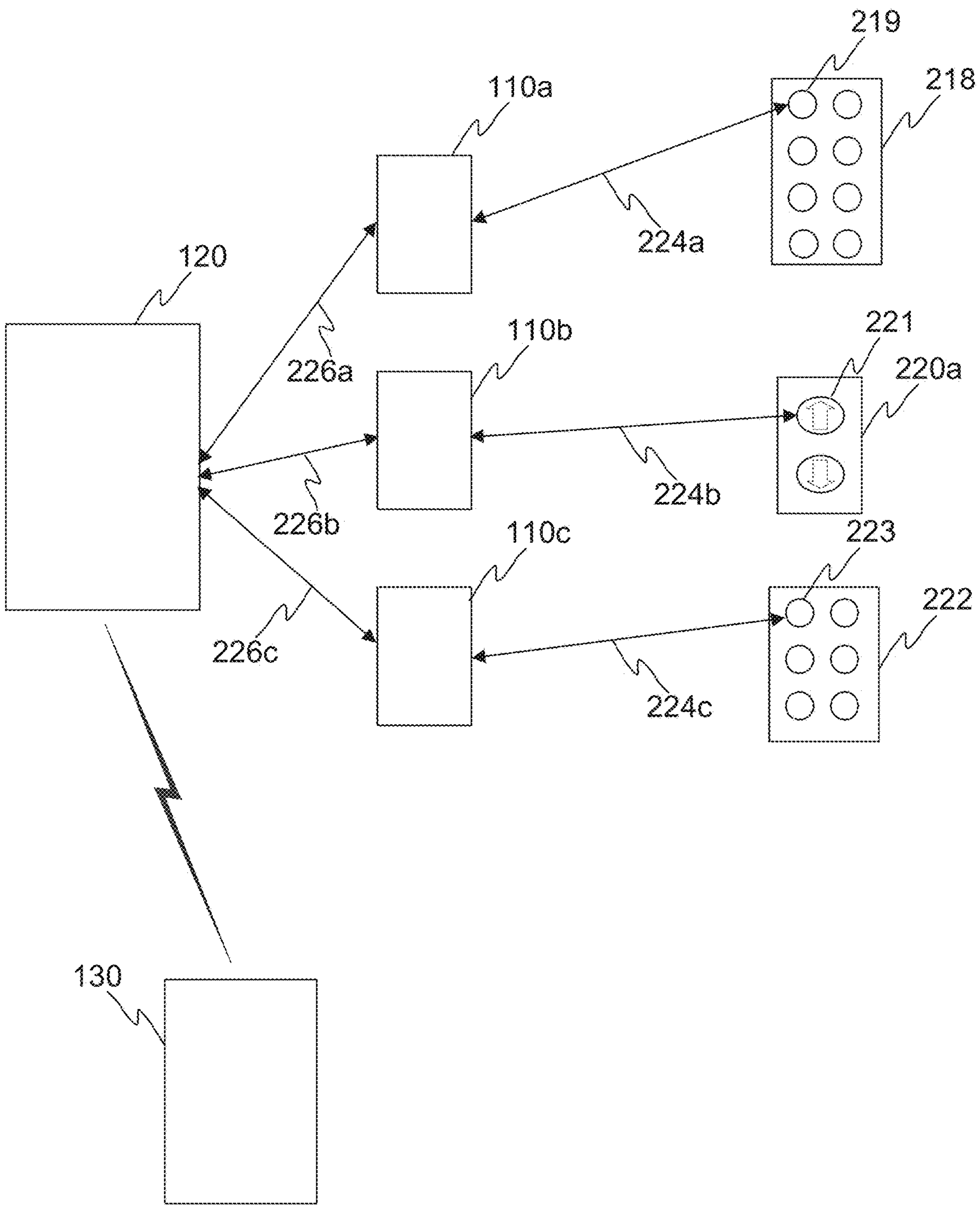
FIG. 2B illustrates an example implementation of a remote monitoring system to an example elevator system.

FIG. 2B illustrates an example implementation of the remote monitoring system 100 to an example elevator system, e.g. elevator system 200 illustrated in FIG. 2A. The example remote monitoring system 100 illustrated in FIG. 2A comprises one remotely operable intermediate device 110*a* arranged, i.e. electrically connected, to an elevator user interface button 219 of the car operating panel 218, one remotely operable intermediate device 110*b* arranged i.e. electrically connected, to an elevator user interface button 221 of the landing call panel 220*a* of the landing 208*a* of the elevator system 200, and one remotely operable intermediate device 110*c* arranged, i.e. electrically connected, to one button 223 of the inspection drive station 222. The electrical connection 225*a*-225*c* between the at least one intermediate device 110*a*-110*c* and the elevator buttons 219, 221, 223 may be provided, e.g. via contactor, such as a wire or similar. The intermediate devices 110*a*-110*b* may be communicatively coupled 226*a*-226*c* to the monitoring unit 120 via a conductor, such as wire or similar, or wirelessly. The example of FIG. 2B illustrates the connections between the entities, but not the physical locations of the entities in the elevator system 200. The car operating panel 218 may comprise one or more elevator user interface buttons 219 for controlling at least one operation of the elevator system, e.g. to move the elevator car 202 to a desired landing, open or close the elevator doors (landing door 216*a*-216*n* and/or elevator car door 212), generating an elevator alarm, making an emergency call, etc. The landing call panel 220*a*-220*n* may comprise one or more elevator user interface buttons 221 for controlling the operation of the elevator system, e.g. to move the elevator car 202 to a desired landing. The inspection drive station 222 may comprise one or more buttons 223 for providing inspection and/or maintenance operations of the elevator system 200. The inspection drive station 222 may be arranged inside the elevator shaft 206, for example to a pit of the elevator shaft 206 or to the roof of the elevator car 202. The inspection drive station may be used for example in an inspection drive preformed from inside the elevator shaft 206. The inspection drive may be performed with reduced speed during for example maintenance or installation of the elevator system. The inspection drive station shall be accessible to authorized persons only, e.g. a maintenance personnel. The present invention is not limited to a specific number of intermediate devices 110 and the remote monitoring system 100 may comprise any number of intermediated devices 110*a*-110*c* arranged to any elevator button of the elevator system 200, either to an elevator user interface button or to a button of an inspection drive station 222 or any other maintenance interface control element, wherein each intermediate device 110*a*-110*c* may generate a remote command for controlling at least one operation of the elevator system 100.

Next the operation of the remote monitoring system 100 comprising one intermediate device 110 is described, but the remote monitoring system 100 according to the invention may further comprise more than one intermediate device 110. The monitoring unit 120 is configured to control the intermediate device 110 to generate a remote command for controlling at least one operation of the elevator system. The monitoring unit 120 may for example generate for the intermediate device 110 one or more control signals comprising an instruction to generate the remote command. The generated remote command may be an elevator command or a maintenance command.

The monitoring unit 120 may be configured to control the intermediate device 110 in response to receiving an instruction from the external computing entity 130. The external computing entity 130 may obtain operational data of the elevator system, e.g. movement data of the elevator car 202, movement data of the elevator door, etc., from the monitoring unit 120. If the external computing entity 130 detects an indication that the elevator system is out of service, e.g. a stoppage of the elevator car 202, based on the obtained operational data of the elevator system, it may generate an instruction for the monitoring unit 120 to control the intermediate device 110 to generate a remote command. Alternatively or in addition, the monitoring unit 120 may be configured to control the intermediate device 110 according to a predefined time-scheme, i.e. time schedule. The predefined time-scheme may comprise regular intervals, e.g. once a year, once a month, once a week, etc., or irregular time intervals. This enables scheduled remote monitoring of the elevator system. For example, the predefined time-scheme may be such that the monitoring unit 120 may be configured to control the intermediate device 110 to generate a remote elevator once a month in order to monitor at least one operation of the elevator system.

The generated remote command may be a remote elevator command, e.g. a landing call, destination call, or a car call. The landing call may comprise information of the direction, i.e. upwards or downwards, to which elevator car is desired to travel. Destination call may comprise information of the desired landing to which the elevator car is desired to travel. The generated remote command may be a destination call only, when the remote monitoring system is implemented in an elevator system comprising an elevator group. The car call may comprise an information of the landing to which the elevator car is desired to travel. If the generated remote elevator command is a landing call, destination call, or a car call, the operation of the elevator system may be movement of the elevator car 202. In other words, the intermediate device 110 generates a landing call, destination call, or a car call in response to receiving one or more control signals from the monitoring unit 120 in order to move the elevator car 202 according to the generated landing call, destination call, or car call. Alternatively or in addition, the generated remote command may be a remote elevator command, e.g. one of the following: an emergency call, elevator alarm, opening or closing command of an elevator door (e.g. a landing door 216*a*-216*n* and/or elevator car door 212); and the corresponding operation of the elevator system is at least the one of the following: making of an emergency call, generating an elevator alarm, opening or closing an elevator door, respectively. Alternatively or in addition, the generated remote command may be a maintenance command and the corresponding operation of the elevator system may be a maintenance operation, e.g. an inspection drive.

The remote command generated by the intermediate device 110 may correspond to an elevator command generated in response to an activation of an elevator user interface button by an elevator passenger or to a maintenance command generated in response to an activation of an elevator button of inspection drive station or any other maintenance interface control element by a maintenance personnel. The intermediate device 110 may receive from the monitoring device 120 one or more control signals comprising an instruction to generate the remote command by creating an electric connection between terminals of a switch of the elevator button in order to imitate activation, e.g. pushing, of said elevator button. In other words, the intermediate device 110 acts as a remote operable elevator button, which may be used to imitate, i.e. simulate, activation, e.g. pushing, of an elevator button. The monitoring unit 110 is electrically connected via e.g. a conductor, such as a wire or similar, to the terminals of the switch of the elevator button to be able to create the electric connection between the terminals of the switch of the elevator button.

The intermediate device 110 may be electrically connected to bridge a switch of an elevator button. The verb "bridging" means to creating an electric connection between the terminals of a switch of the elevator button in order to imitate activation, e.g. pushing, of said elevator button. The intermediate device 110 may comprise a switching device, e.g. relay, solid-state switch, microswitch, membrane switch, etc., for providing the bridging the switch of the elevator button. In other words, the switching device may create an electric connection between the terminals of the switch of the elevator button causing that the switch of the elevator button is short-circuited to generate the command corresponding to an command generated in response to an activation of said elevator button. The control signal received from the monitoring device 120 may be a simple on/off signal to change the state of the switching device from open state to closed state and the other way around. For example, in response to receiving an on signal from the monitoring device 120, the switching device may change its state to the closed state, in which the switching device may create the electric connection between the terminals of the switch of the elevator button. Alternatively, in response to receiving an off signal from the monitoring device 120, the switching device may change its state to the open state, in which the switching device does not create electric connection between the terminals of the switch of the elevator button.

The elevator button may be an elevator car call button of a car operating panel 218 arranged inside the elevator car 202 or a landing call button of a landing call panel 220*a*-220*n* of a landing of the elevator system 200. Alternatively or in addition, the elevator user interface button may be any other elevator user interface button of the elevator system 100, e.g. an emergency call button, an elevator alarm button, opening or closing button of an elevator door, etc. of the car operating panel 218. Alternatively or in addition, the elevator button may be a button of an inspection drive station 222 or any other maintenance interface control element.

The monitoring unit 120 may further be configured to monitor a response of the elevator system 200 to the remote command. The monitoring unit 120 may comprise one or more sensor devices, e.g. accelerometer, magnetometer, gyroscope, inclinometer, pressure sensor, temperature sensor, microphone, current sensor, etc., for detecting at least one operation of the elevator system 200 and/or for providing the operational data of the elevator system 200.

The monitoring unit 120 may further be configured to define, i.e. conclude, whether the elevator system 200 is responding to the remote command in expected manner, e.g. by comparing the monitored response to a reference response. The responding in expected manner and/or the reference response may depend on the generated remote command. For example, if the generated remote command is a remote elevator command, e.g. a landing call or an elevator car call, the reference response to which the monitoring unit 120 may compare the monitored response is movement of the elevator car 202 and the elevator system may be defined to respond to the generated remote elevator command in the expected manner, when the monitoring unit 120 detects that the elevator car 202 is moving. In case the monitoring unit 120 detects that the elevator car 202 is not moving, it defines that the elevator system 200 is not responding to the remote elevator command in the expected manner. According to another non-limiting example, if the remote elevator command is an elevator alarm, the reference response to which the monitoring unit 120 may compare the monitored response is an alarm signal and the elevator system may be defined to respond to the generated remote elevator command in the expected manner, when the monitoring unit 120 detects an alarm signal. In case the monitoring unit 120 does not detect an alarm signal, it defines that the elevator system 200 is not responding to the remote elevator command in the expected manner. According to yet another non-limiting example, if the remote elevator command is opening command of the elevator door, the reference response to which the monitoring unit 120 may compare the monitored response is opening of the elevator door and the elevator system may be defined to respond to the generated remote elevator command in the expected manner, when the monitoring unit 120 detects opening of the elevator door. In case the monitoring unit 120 does not detect opening of the elevator, it defines that the elevator system 200 is not responding to the remote elevator command in the expected manner.

In response to a definition that the elevator system 200 is not responding to the remote command in expected manner, the monitoring unit 120 may be further configured to generate a signal indicating that the elevator system is out of service to the external computing entity 130. Preferably, indicating that the elevator system is out of service may be transmitted to the external computing entity 130 immediately, i.e. in real time. In response to receiving the indication the signal indicating that the elevator system is out of service the external computing entity 130 may be configured to generate an indication that the elevator system is out of service to instruct maintenance personnel to fix the elevator system, for example. This enables that the fixing of the elevator system may be expedited in order to improve the availability of the elevator system, i.e. the time that elevator system is in operation.

Alternatively or in addition, the monitoring unit 120 may provide, e.g. communicate, the monitored response, i.e. generate one or more signals comprising the monitored response, to the external computing entity 130, which performs the definition whether the elevator system 200 is responding to the remote command in expected manner. The external computing entity 130 may be configured to compare the received monitoring result to the reference response to conclude or otherwise conclude whether the elevator system 200 is responding to the remote command in expected manner or not. In response to concluding that the elevator system 200 is not responding to the remote command in expected manner, the external computing entity 130 may be configured to generate an indication that the elevator system is out of service to instruct maintenance personnel to fix the elevator system, for example.

Next the invention is described by applying the inventive idea to a non-limiting example situation, wherein the external computing entity 130 detects based on operational data, e.g. the movement data of the elevator car, obtained from the monitoring unit 120 that the elevator car 202 is stopped. In response to the detection the computing unit 130 generates an instruction for the monitoring unit 120 to control the remotely operable intermediate device 110 to generate a remote command for controlling at least one operation of the elevator system.

In this example the remote elevator command is a landing call and comprises an instruction for the elevator car 202 to move to a desired landing. After generating the remote elevator command, the monitoring unit 120 monitors the response of the elevator system to the remote elevator command. As the generated remote elevator command is a landing call in this example, the monitoring unit 120 monitors the movement of the elevator car 202 by means of one or more sensor devices of the monitoring unit 120, e.g. accelerometer. If the monitoring unit 120 detects that the elevator car 202 is moving in response to the generated elevator command, it indicates that the movement elevator car 202 is in fact not stopped and the elevator system is still operating. If the monitoring unit 120 detects that the elevator car 202 in not moving in response to the generated elevator command, it indicates that the movement elevator car 202 is in fact stopped. In response to a detection that the elevator system 200 is not responding to the remote elevator command in expected manner, the monitoring unit 120 may generate a signal indicating that the elevator system 200 is out of service to the external computing entity 130. Alternatively, the monitoring unit 120 may provide the monitoring result, i.e. monitored response of the elevator system, to the external computing entity 130, which detects from the monitoring result is the elevator car moving or not.

Next the invention is described by applying the inventive idea to another non-limiting example situation, wherein the external computing entity 130 detects based on operational data, e.g. movement data of the elevator door, obtained from the monitoring unit 120 that the elevator door, e.g. the elevator car door 212 is not opening. In response to the detection the computing unit 130 generates an instruction for the monitoring unit 120 to control the remotely operable intermediate device 110 to generate a remote command for controlling at least one operation of the elevator system. In this example the remote elevator command is opening command of the elevator car door 212 comprising an instruction to open the elevator car door 212. After generating the remote elevator command, the monitoring unit 120 monitors the response of the elevator system 200 to the remote elevator command. As the generated remote elevator command is an opening command of the elevator car door 212 in this example, the monitoring unit 120 monitors the movement of the elevator car door by means of one or more sensor devices of the monitoring unit 120, e.g. accelerometer arranged to the elevator car door 212. If the monitoring unit 120 detects that the elevator car door 212 is opening in response to the generated elevator command, it indicates that the movement elevator door is in fact not stopped and the elevator system is still operating. If the monitoring unit 120 detects that the elevator car door 212 is not opening in response to the generated elevator command, it indicates that the movement elevator car door 212 is in fact stopped. In response to a detection that the elevator system 200 is not responding to the remote elevator command in expected manner, the monitoring unit 120 may generate a signal indicating that the elevator system 200 is out of service to the external computing entity 130. Alternatively, the monitoring unit 120 may provide the monitoring result, i.e. monitored response of the elevator system, to the external computing entity 130, which detects from the monitoring result is the elevator car door opening or not.

Figure 3A:
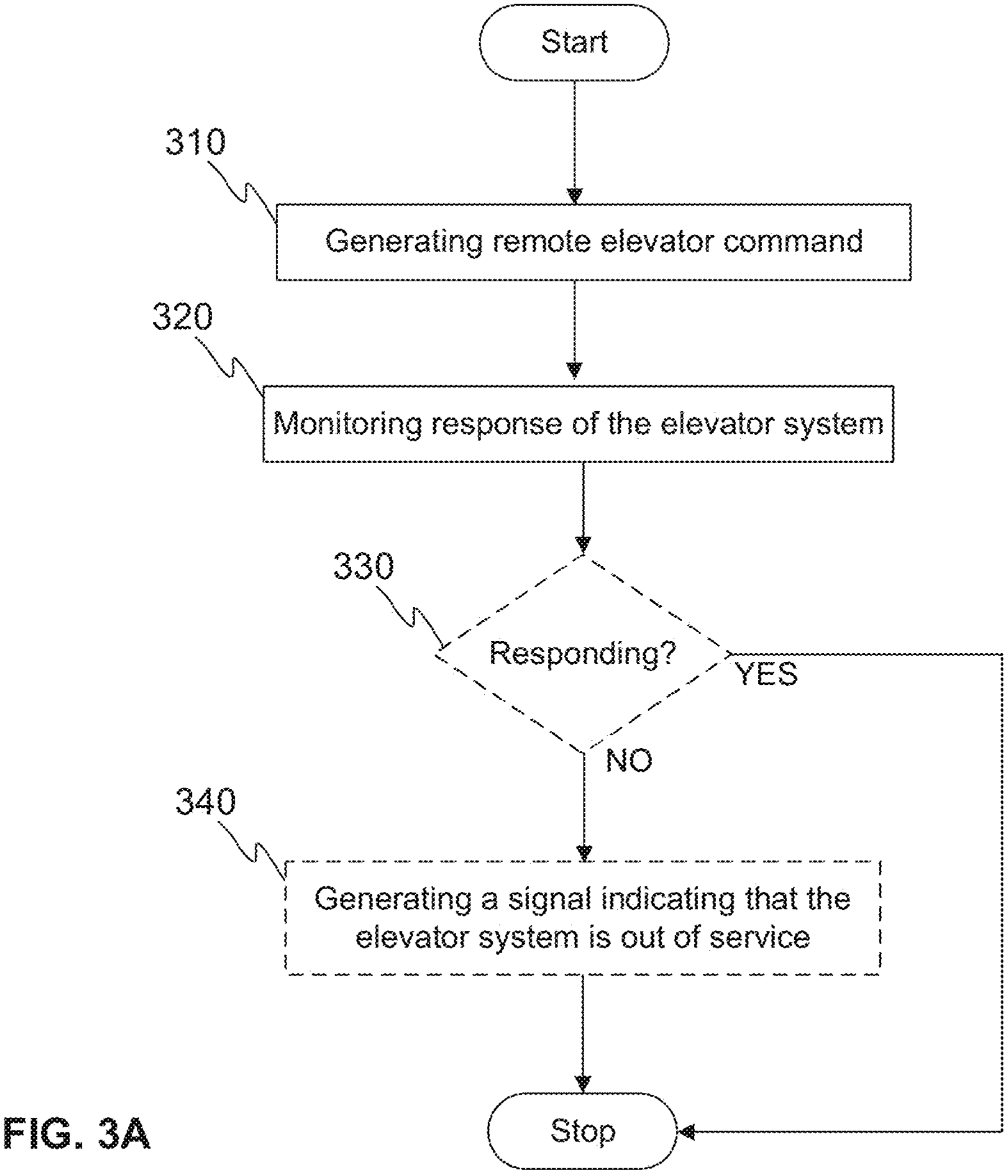
FIG. 3A illustrates schematically an example of a method according to the invention.

Above the invention is described relating to the remote monitoring system 100 for an elevator system. Next an example of a method for remotely monitoring an elevator system according to the invention is described by referring to FIG. 3. FIG. 3 schematically illustrates the invention as a flow chart. At the step 310 the monitoring unit 120 controls a remotely operable intermediate device 110 to generate a remote command for controlling at least one operation of the elevator system 200. The monitoring unit 120 may control the intermediate device 110 in response to receiving an instruction from the external computing entity 130. Alternatively or in addition, the monitoring unit 120 may be control the intermediate device 110 according to a predefined time-scheme, i.e. time schedule as described above. The generated remote elevator command may be a landing call or an elevator car call. If the generated remote elevator command is a landing call or an elevator car call, the operation of the elevator system may be movement of the elevator car 202. Alternatively or in addition, the generated remote elevator command may be at least one of the following: an emergency call, elevator alarm, opening or closing command of an elevator door (e.g. a landing door and/or elevator car door); and the corresponding operation of the elevator system is at least the one of the following: making of an emergency call, generating an elevator alarm, opening or closing an elevator door, respectively.

At the step 320 the monitoring unit monitors a response of the elevator system to the remote command as described above. The method may further comprise defining whether the elevator system 200 is responding 330 to the remote command in expected manner e.g. by comparing the monitored response to a reference response. The comparison may be provided by the monitoring unit 120. The method may further comprise generating 340 a signal indicating that the elevator system is out of service, in response to a detection that the elevator system is not responding to the remote command in expected manner as describe above.

Figure 3B:
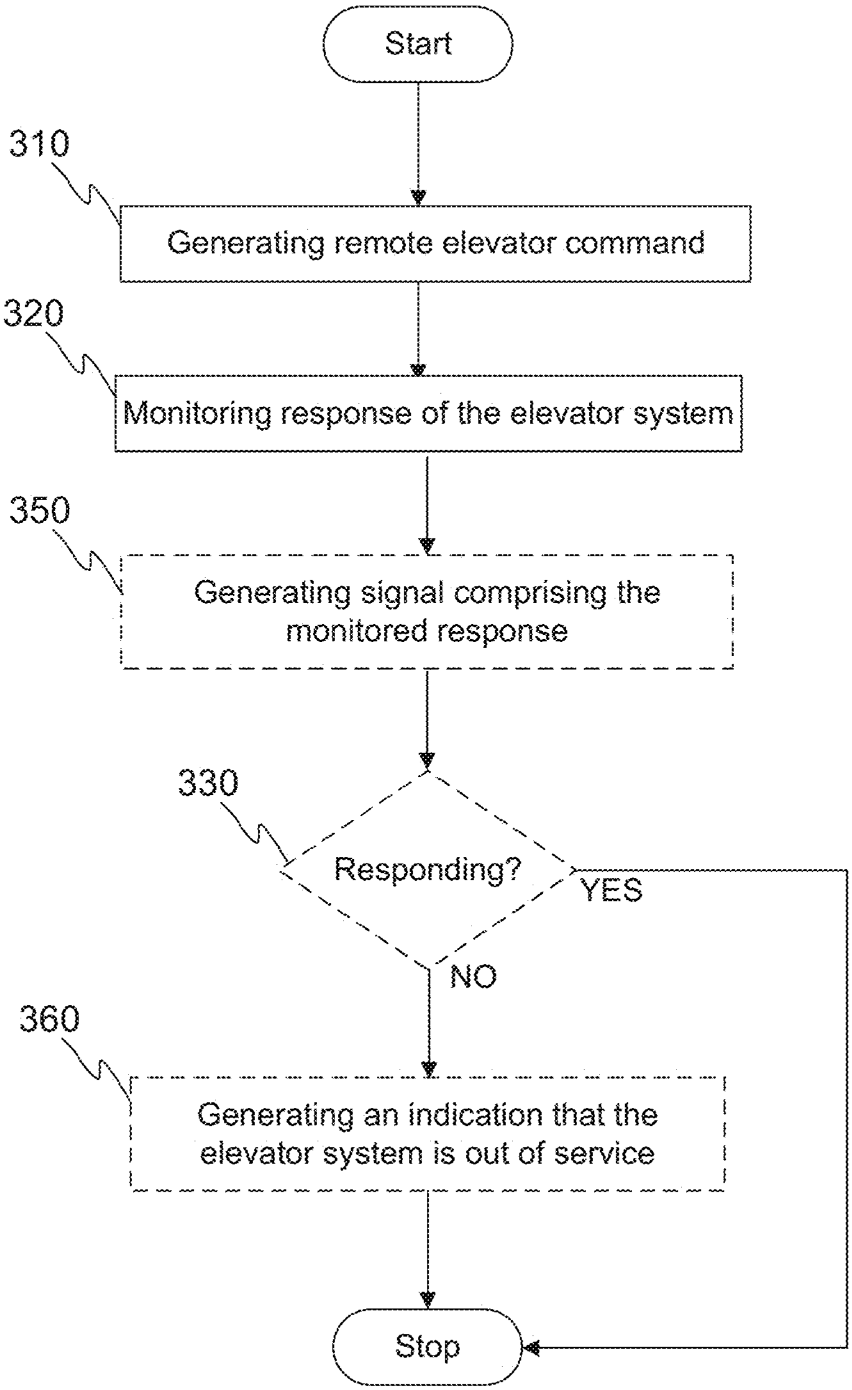
FIG. 3B illustrates schematically another example of a method according to the invention.

Alternatively or in addition, the monitoring unit 120 may provide 350 the monitored response, i.e. generate one or more signals comprising the monitored response, to the external computing entity 130, which then performs definition whether the elevator system 200 is responding 330 to the remote command in expected manner. The external computing entity 130 may compare the received monitoring result to the reference response to conclude or otherwise conclude whether the elevator system 200 is responding to the remote command in expected manner or not. This is illustrated in FIG. 3B, wherein another example of a method for remotely monitoring an elevator system according to the invention is presented. In response to a definition that the elevator system 200 is not responding to the remote command in expected manner, the external computing entity 130 may generate 360 an indication that the elevator system is out of service to instruct maintenance personnel to fix the elevator system, for example.

Figure 4:
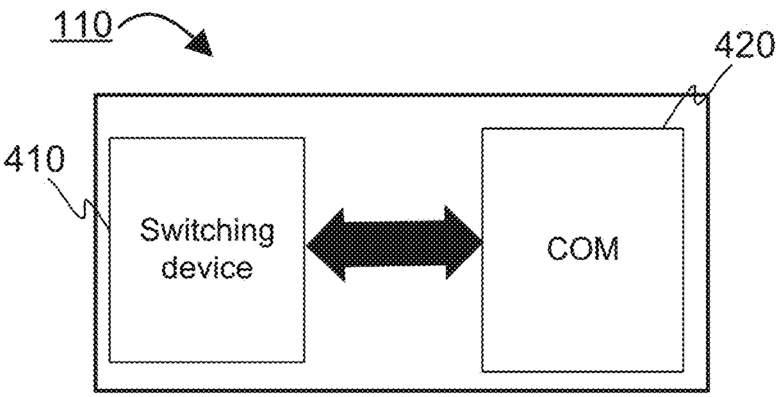
FIG. 4 illustrates schematically an example of components of a remotely operable intermediate device according to the invention.

FIG. 4 schematically illustrates an example of components of the remotely operable intermediate device 110 according to the invention. The intermediate device 110 comprises at least a switching device 410. The switching devices 410 may comprise e.g. relay, solid-state switch microswitch, membrane switch, etc., for providing an electric connection between the terminals of a switch of the elevator button in order to imitate activation, e.g. pushing, of the elevator button as discussed above. The remotely operable intermediate device 110 further comprises a communication unit 420 for providing an interface for the electrical connection to the terminals of the switch of the elevator button and for the communication with the monitoring unit 120. The communication between the intermediate device and the monitoring unit 120 may be based on at least one known communication technologies, either wired or wireless, in order to exchange pieces of information as described earlier.

Figure 5:
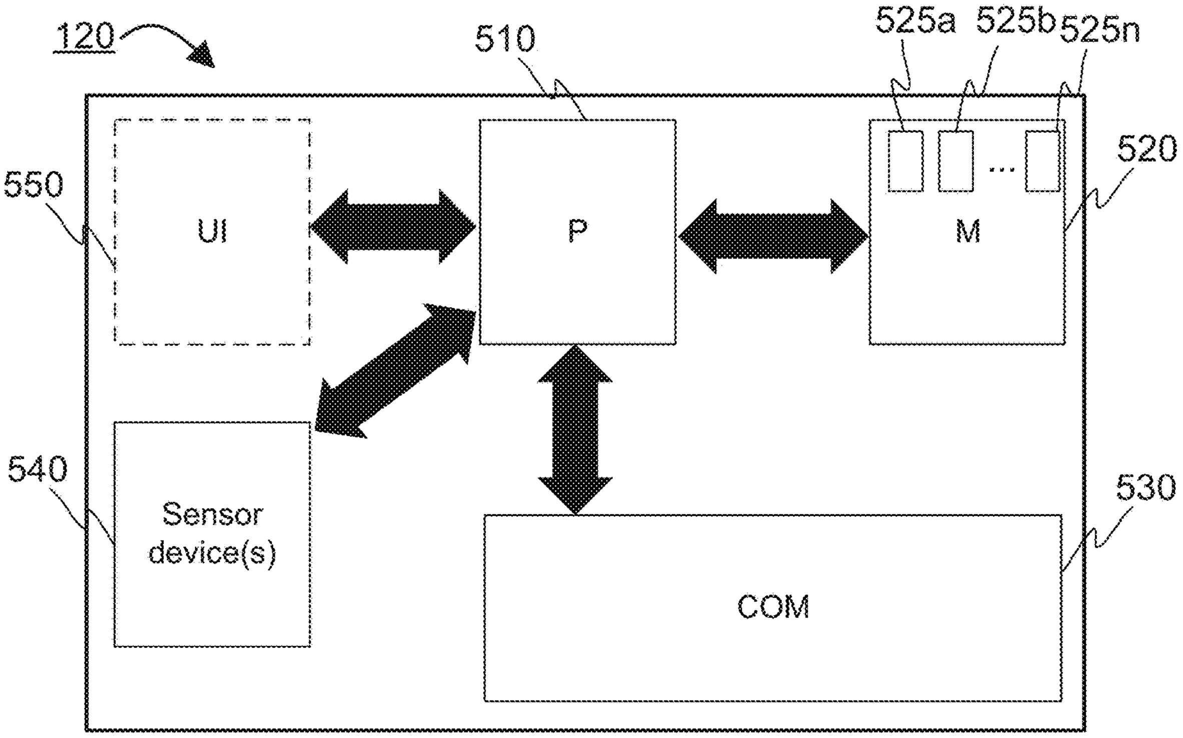
FIG. 5 illustrates schematically an example of components of a monitoring unit according to the invention.

FIG. 5 schematically illustrates an example of components of the monitoring unit 120 according to the invention. The monitoring unit 120 may comprise a processing unit 510 comprising one or more processors, a memory unit 520 comprising one or more memories, a communication unit 530 comprising one or more communication devices, one or more sensor devices 440 and possibly a user interface (UI) unit 550. The mentioned elements of may be communicatively coupled to each other with e.g. an internal bus. The one or more processors of the processing unit 510 may be any suitable processor for processing information and control the operation of the monitoring unit 120, among other tasks. The memory unit 520 may store portions of computer program code 525*a*-525*n* and any other data, and the processing unit 520 may cause the monitoring unit 120 to operate as described by executing at least some portions of the computer program code 525*a*-525*n* stored in the memory unit 520. Furthermore, the one or more memories of the memory unit 520 may be volatile or nonvolatile. Moreover, the one or more memories are not limited to a certain type of memory only, but any memory type suitable for storing the described pieces of information may be applied in the context of the invention. The communication unit 530 may be based on at least one known communication technologies, either wired or wireless, in order to exchange pieces of information as described earlier. The communication unit 530 provides an interface for communication with any external unit, such as the at least one remotely operable intermediate device 110, the elevator control system 210, the external computing entity 130, database and/or any external systems. The one or more sensor devices 540 may comprise, e.g. accelerometer, magnetometer, gyroscope, inclinometer, pressure sensor, temperature sensor, microphone, current sensor, etc., for detecting at least one operation of the elevator system 200 and/or for providing the operational data of the elevator system 200. The user interface 550 may comprise I/O devices, such as buttons, keyboard, touch screen, microphone, loudspeaker, display and so on, for receiving input and out-putting information. The power for the monitoring unit 120 may be provided from the mains via a plug or similar. Alternatively or in addition, the monitoring unit 120 comprise a rechargeable battery for providing power to enable battery operated monitoring unit, for example in power failure situations.

Operationally the at least one intermediate device 110 and the monitoring unit 120 are implemented as separate entities. Physically the at least one intermediate device 110 and the monitoring unit 120 may be implemented as separate physical entities. Alternatively, physically the at least one intermediate device 110 and the monitoring unit 120 may be implemented inside one physical entity, e.g. inside one casing, but still as separate operational entities.

Figure 6:
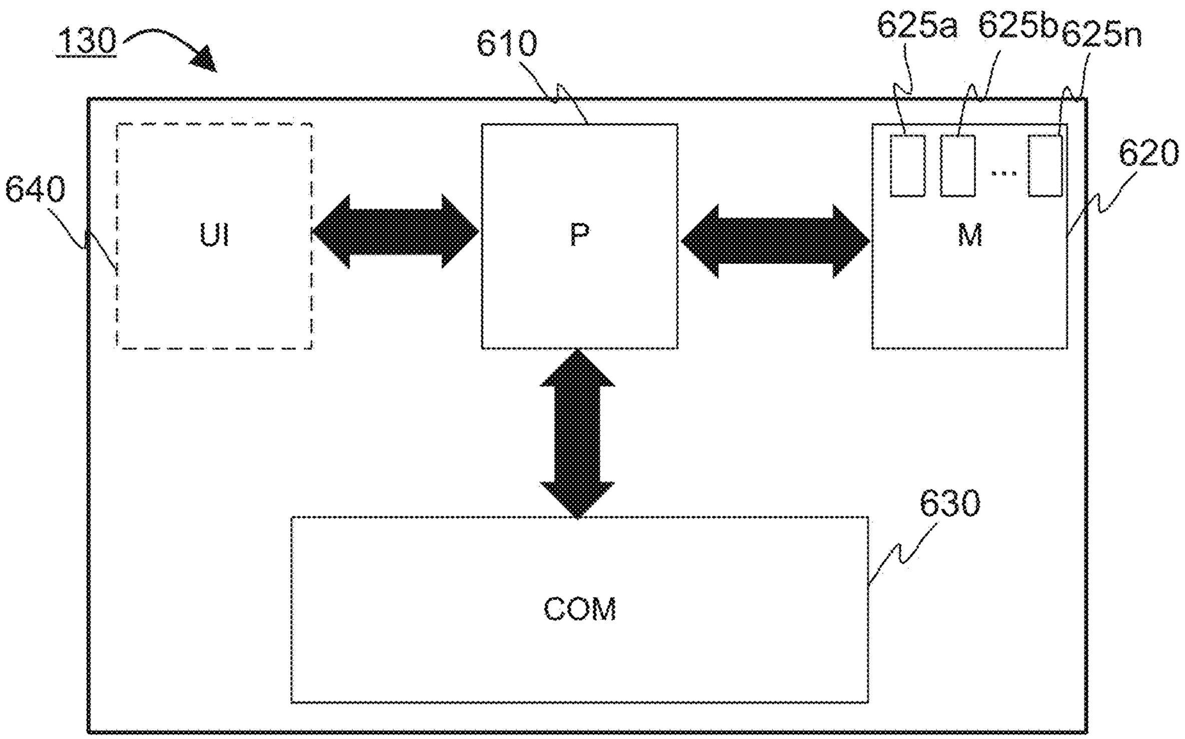
FIG. 6 illustrates schematically an example of components of an external computing entity according to the invention.

FIG. 6 schematically illustrates and example of components of the external computing entity 130 according to the invention. The external computing entity 130 may comprise a processing unit 610 comprising one or more processors, a memory unit 620 comprising one or more memories, a communication unit 630 comprising one or more communication devices, and possibly a user interface (UI) unit 640. The mentioned elements of may be communicatively coupled to each other with e.g. an internal bus. The memory unit 620 may store portions of computer program code 625*a*-625*n* and any other data, and the processing unit 620 may cause the external computing entity 130 to operate as described by executing at least some portions of the computer program code 625*a*-625*n* stored in the memory unit 620. The communication unit 630 may be based on at least one known communication technologies, either wired or wireless, in order to exchange pieces of information as described earlier. The communication unit 630 provides an interface for communication with any external unit, such as the monitoring unit 130, database and/or any external systems. The user interface 640 may comprise I/O devices, such as buttons, keyboard, touch screen, microphone, loudspeaker, display and so on, for receiving input and outputting information.

The above described remote monitoring system 100 and method for remotely monitor an elevator system enables confirmation that the elevator system is in service without a need to visit the site, i.e. the elevator system. Furthermore, at least some of the embodiments of the above described invention improves service need coverage and accuracy with minimal disruption without a need for a trade-off as in case of the prior art solutions, i.e. the majority of out of service situations are detected and the number of falls alarms is minor. This reduces the number of unnecessary service visits to the site and thus also the costs caused by the unnecessary service visits. The above described remote monitoring system and method for remotely monitor an elevator system improve at least partly reliability of monitoring of an elevator system. Moreover, the system and method according to the invention may be implemented in any newly built or existing elevator system irrespective of manufacturer of the elevator system.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A remote monitoring system for an elevator system, comprising:
- at least one remotely operable intermediate device, and
- a monitoring unit for remotely controlling operation of the at least one remotely operable intermediate device, wherein the monitoring unit is configured to
  - control the at least one remotely operable intermediate device to generate a remote command for controlling at least one operation of the elevator system, and
  - monitor a response of the elevator system to the remote command,
  - wherein the at least one remotely operable intermediate device is electrically connected to terminals of a switch of an elevator button and is configured to electrically connect the terminals to each other.

2. The remote monitoring system according to claim 1, wherein the monitoring unit is further configured to define whether the elevator system has responded to the remote command in an expected manner.

3. The remote monitoring system according to claim 2, wherein the monitoring unit is further configured to generate a signal indicating that the elevator system is out of service to an external computing entity, in response to detection that the elevator system is not responding to the remote command in the expected manner.

4. A remote monitoring system for an elevator system, comprising:
- at least one remotely operable intermediate device, and a monitoring unit for remotely controlling operation of the at least one remotely operable intermediate device, wherein the monitoring unit is configured to control the at least one remotely operable intermediate device to generate a remote command for controlling at least one operation of the elevator system, and monitor a response of the elevator system to the remote command, wherein the monitoring unit is configured to provide a monitored response to an external computing entity, and the external computing entity is configured to define whether the elevator system is responding to the remote command in an expected manner based on the monitored response.

5. The remote monitoring system according to claim 1, wherein the monitoring unit is configured to control the at least one remotely operable intermediate device in response to receiving an instruction from an external computing entity.

6. The remote monitoring system according to claim 3, wherein the external computing entity comprises one of a cloud server, a service center, and a data center.

7. The remote monitoring system according to claim 1, wherein the remote command is a remote elevator command, wherein the remote elevator command is a landing call, destination call, or a car call, and the at least one operation of the elevator system is movement of an elevator car.

8. The remote monitoring system according to claim 1, wherein the remote command is a remote elevator command, wherein the remote elevator command is one of an emergency call, an elevator alarm, and an opening or closing command of an elevator door, and a corresponding operation of the elevator system is one of making of an emergency call, generating an elevator alarm, and opening or closing an elevator door.

9. The remote monitoring system according to claim 1, wherein the remote command is a remote maintenance command and the at least one operation of the elevator system is a maintenance operation.

10. The remote monitoring system according to claim 1, wherein the at least one remotely operable intermediate device is retrofittable to an existing elevator system.

11. The remote monitoring system according to claim 1, wherein the remote command generated by the at least one remotely operable intermediate device corresponds to a command generated in response to an activation of an elevator button.

12. The remote monitoring system according to claim 1, wherein the at least one remotely operable intermediate device comprises a switching device configured to bridge the terminals of the switch of the elevator button.

13. The remote monitoring system according to claim 12, wherein the switching device is configured to create an electric connection between the terminals of the switch of the elevator button to short-circuit the switch of the elevator button to generate a command corresponding to a command generated in response to an activation of the elevator button.

14. The remote monitoring system according to claim 1, wherein the monitoring unit is a retrofittable monitoring unit arranged to an existing elevator system and is independent of an elevator control system of the elevator system.

15. A method of remotely monitoring an elevator system, the method comprising:

controlling at least one remotely operable intermediate device to generate a remote command for controlling at least one operation of the elevator system, monitoring a response of the elevator system to the remote command, providing a monitored response to an external computing entity, and determining at the external computing entity whether the elevator system is responding to the remote command in an expected manner based on the monitored response.

16. The method of remotely monitoring an elevator system according to claim 15, wherein the external computing entity comprises one of a cloud server, a service center, and a data center.

17. The remote monitoring system according to claim 1, wherein the elevator button comprises an elevator user interface button of a car operating panel in an elevator of the elevator system.

18. The remote monitoring system according to claim 1, wherein the elevator button comprises an elevator user interface button of a landing call panel at a landing outside an elevator of the elevator system.

19. The remote monitoring system according to claim 1, wherein the elevator button comprises a maintenance control button of an inspection drive station of the elevator system.

* * * * *